(12) United States Patent
Cantwell et al.

(10) Patent No.: US 7,689,850 B2
(45) Date of Patent: Mar. 30, 2010

(54) SYSTEM AND METHOD FOR ADAPTIVE INFORMATION HANDLING SYSTEM POWER MANAGEMENT

(75) Inventors: Thomas Cantwell, Liberty Hill, TX (US); Roy W. Stedman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 583 days.

(21) Appl. No.: 11/563,817

(22) Filed: Nov. 28, 2006

(65) Prior Publication Data

US 2008/0126815 A1    May 29, 2008

(51) Int. Cl.
*G06F 1/32* (2006.01)
(52) U.S. Cl. ...................................... 713/323
(58) Field of Classification Search .................. 713/300, 713/323
See application file for complete search history.

(56) References Cited

U.S. PATENT DOCUMENTS

| | | | | |
|---|---|---|---|---|
| 5,692,204 A | | 11/1997 | Rawson et al. ............... 395/750 |
| 5,708,820 A | * | 1/1998 | Park et al. .................... 713/323 |
| 6,654,895 B1 | * | 11/2003 | Henkhaus et al. ............ 713/320 |
| 6,961,859 B2 | * | 11/2005 | Derocher et al. ............. 713/320 |
| 6,996,728 B2 | | 2/2006 | Singh .......................... 713/300 |
| 7,069,462 B2 | * | 6/2006 | Owen et al. .................. 713/502 |
| 7,437,578 B2 | * | 10/2008 | Menzl ......................... 713/300 |
| 7,472,291 B2 | * | 12/2008 | Chen et al. ................... 713/300 |

* cited by examiner

*Primary Examiner*—Thomas Lee
*Assistant Examiner*—Eric Chang
(74) *Attorney, Agent, or Firm*—Hamilton & Terrile, LLP; Robert W. Holland

(57) ABSTRACT

Information handling system power management in standby and hibernate states is adapted to reduce transition times for end user requests to resume to an operational state. During fast resume time periods, transitions to the hibernate state are limited so that recovery to an operational states has the reduced resume time associated with the standby state. The fast resume time periods are set by user preference or automatically set by monitoring end user interactions with the information handling system to predict fast resume times appropriate for the end user. In one embodiment, a power manager automatically transitions the information handling system from the hibernate state to a standby state a predetermined time period before a fast resume period begins.

20 Claims, 3 Drawing Sheets

Power Management Interface 32

Fast Resume Preferences 36

| Monday | 8 AM | to | 5 PM |
|---|---|---|---|
| ⋮ | | | |
| Sunday | None | to | None |

☐ Enable Automated Rapid Resume Determinations

SYSTEM AND METHOD FOR ADAPTIVE INFORMATION HANDLING SYSTEM POWER MANAGEMENT

BACKGROUND OF THE INVENTION

1. Field of the Invention

The present invention relates in general to the field of information handling system power management, and more particularly to a system and method for adaptive information handling system power management.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue often considered in the design and use of information handling systems is power consumption. Desktop information handling system operating in an enterprise environment can consume a considerable amount of energy. This has led to the incorporation of various power management capabilities in operating systems to conserve energy. For portable information handling systems, the use of these power management capabilities have the added benefit of conserving battery life by reducing power consumption during end user inactivity. The power management scheme commonly used with the Microsoft Windows operating system is the Advanced Configuration and Power Interface (ACPI) having five power states known as S1 through S5. The ACPI S3 standby mode saves power by shutting down most components but performing a "slow refresh" for information stored in RAM. The S3 power mode substantially reduces power consumption yet allows for relatively rapid recovery to an operational state since the operating system remains loaded in RAM, thus alleviating the need to boot the system. The S4 hibernate mode saves additional power by storing RAM information in persistent memory, such as a hard disk drive, and then powering down the RAM and other components powered in the S3 mode. Although the S4 mode essentially is an off mode without power provided to the information handling system components, the system transitions to an operational state without a boot by retrieving the information stored on the hard disk drive to RAM. Recovery to an operational state with information stored RAM is more rapid than recovery with information stored in a hard disk drive.

Although ACPI reduced power states reduce power consumption when used, end users often find them inconvenient and thus disable them. Typically, ACPI reduced power states are setup to take effect after certain time periods have passed, such as 15 minutes in which the end user has not manipulated an I/O device. Unfortunately, entry into a reduced power mode often seems to coincide with an end user need to access the system. The transition from a reduced power mode to an operational state delays end user access and thus encourages end users to disable automated entry into reduced power states. Some cascading systems transition first to the S3 reduced power states and then, after an additional time period, transition from the S3 reduced power state to the S4 reduced power state. Although the S4 state reduces power consumption, the transition to an operational state takes a longer period of time, which tends to increase end user frustration with automated power savings.

SUMMARY OF THE INVENTION

Therefore a need has arisen for a system and method which adapts automated power management to end user behavior.

In accordance with the present invention, a system and method are provided which substantially reduce the disadvantages and problems associated with previous methods and systems for managing information handling system power consumption. Reduced power states for an information handling system are selected so that reduced power states having faster resume times are enforced during time periods in which an end user is more likely to resume from the reduced power state to an operational state.

More specifically, a power manager running on an information handling system powers down processing components to reduced power states after predetermined inactivity, such as an S3 standby state having operating system recovery information stored in RAM or an S4 hibernate state having operating system recovery information stored in persistent memory. Fast resume preferences input by the end user or automatically modeled from monitoring end user activity limit transitions to the S4 hibernate state during fast resume time periods, such as work hours on work days. By enforcing the S3 standby mode during fast resume time periods instead of the S4 hibernate mode, resumption to an operational state initiated by the end user will take less time. During non-resume periods, the power manager allows transition to the S4 hibernate mode, however, at the start of a fast resume time period, the power manager initiates transition to the S3 standby mode so that resumption of use of the information handling system will have a fast resume response. In the event that an end user does not initiate use of the system within a predetermined time of an automatic transition from an S4 state to an S3 state, the power manager returns the system to the S4 state to avoid excessive power consumption or battery failure.

The present invention provides a number of important technical advantages. One example of an important technical advantage is that automated power management is adapted to end user behavior. Accepting end user preferences for "fast resume" behavior during specified time periods decreases the impact of power management on system performance without substantially impacting power consumption. For example, the use of the S3 reduced power state during office hours without a transition to S4 decreases resume time to an operational state, while the use of S4 after office hours decreases power consumption and reduces the risk that a portable system will drain its battery in the S3 state. A usage model that predicts end user behavior to transition from S4 to S3 modes before end user initiation of a transition to an operational state provides the benefits of reduced power consumption associated with the S4 mode as well as the reduced transition time associated with the S3 mode.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling systems adapt power management to emphasize fast resume capabilities during time periods where an end user is more likely to resume operations from a powered down state. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
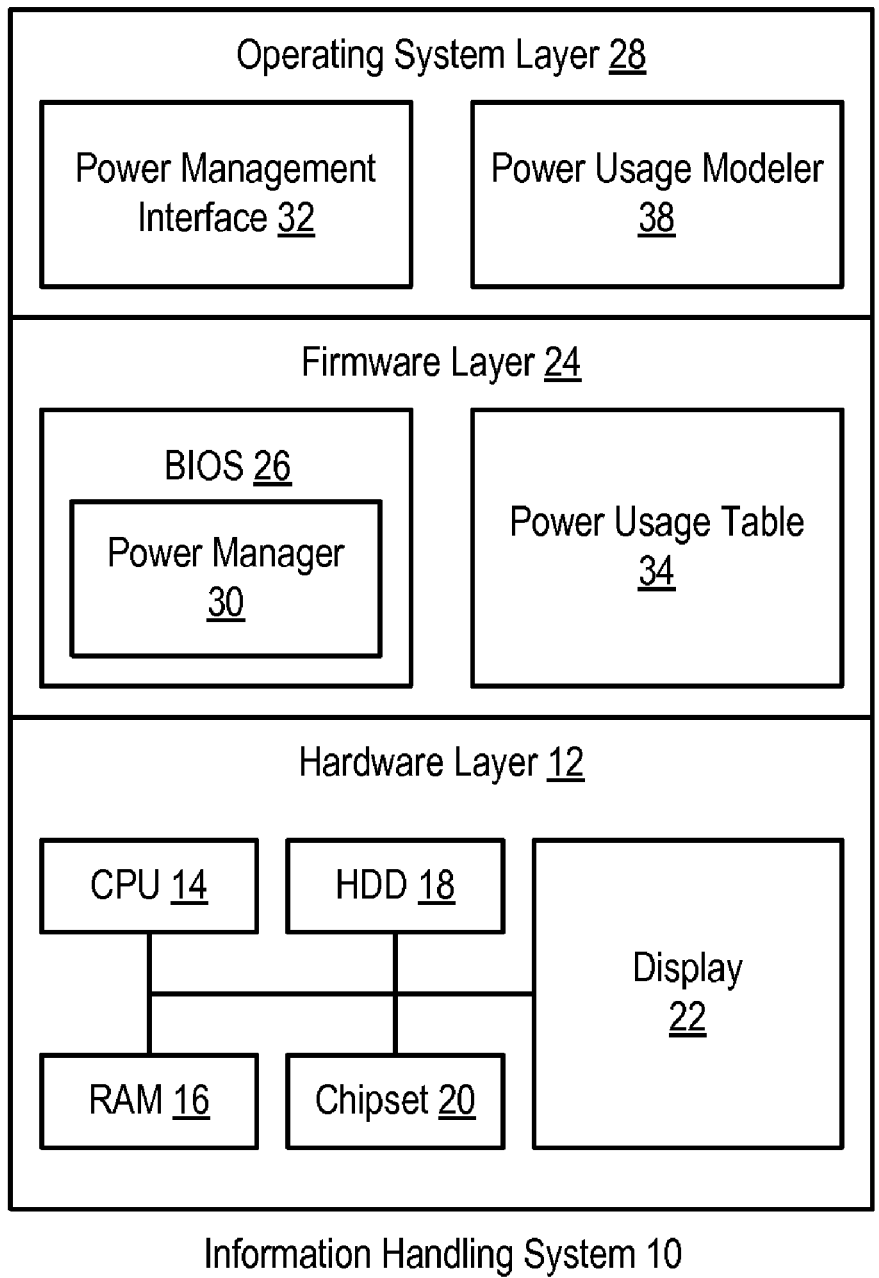
FIG. 1 depicts a block diagram of an information handling system having power management with adaptive fast resume.

Referring now to FIG. 1, a block diagram depicts an information handling system 10 having power management with adaptive fast resume. Information handling system 10 has a hardware layer with processing components that cooperate to process information, such as a CPU 14, RAM 16, hard disk drive 18, chipset 20 and a display 22. Physical management of hardware layer 12 is managed through a firmware layer 24 that coordinates the interaction between processing components, such as with a BIOS 26 running on chipset 20. Coordination of the processing components to run applications is managed by an operating system layer 28, such as with the WINDOWS operating system. Operating system layer 28 and firmware layer 24 cooperate to manage power consumption by the processing components under the control of a power manager 30, such as by powering down processing components during periods of end user inactivity. For example, default power management settings transition information handling system 10 through a succession of reduced power states based on the length of time in which user activity is not detected.

Power manager 30 has an operational state and plural reduced power states to manage power consumption, such as the ACPI states of S0 through S5. For example, in the ACPI S0 state the processing components are fully powered and operational. In the ACPI S3 standby state, operating system recovery information is stored in RAM 16 and the processing components other than RAM 16 are powered down. In the ACPI S4 hibernate state, operating system recovery information is stored in hard disk drive 18 and the processing components, including RAM 16 and hard disk drive 18, are powered down, essentially leaving information handling system 10 off. From the S3 and S4 reduced power states, information handling system 10 resumes normal operations at an end user input by using the operating system recover information to recover to the S0 state. Because operating system recovery information stored in RAM 16 is more quickly accessible than operating system recovery information stored in hard disk drive 18, a resume from the S3 standby state is substantially faster than a resume from the S4 hibernate state. However, the S3 standby state uses some power to maintain the operating system recovery information in RAM 16 while the S4 hibernate state does not use power to maintain the operating system recovery information in the persistent storage of hard disk drive 18. Thus, when an information handling system is powered on a battery, the S3 state cannot be maintained past the battery life while the S4 state can be maintained indefinitely.

Power manager 30 accepts end user preferences for the reduced power states through a power management interface 32. The ACPI standard permits user-defined inactivity periods at which transitions between reduced power states are initiated. For example, after 15 minutes of inactivity power manager 30 initiates the S3 standby state and after 30 minutes of inactivity power manager 30 initiates the S4 hibernate state. In order to reduce the resume time experienced by end users from the powered down states, power manager 30 determines the reduced power state to command based not only on inactivity but also on fast resume preferences of the end user that take into account the likelihood that the end user will initiate a resume during predetermined time periods. For example, a power usage table 34 defines fast resume time periods on a daily and weekly basis in which power manger 30 is limited in performing transitions to the S4 mode, such as during office hours and during the work week. During the fast resume time periods, user inactivity initiates the S3 reduced power state according to the ACPI inactivity preferences but does not initiate the S4 reduced power state unless limited circumstances arise, such as a drained battery. By enforcing the S3 reduced power state instead of the S4 reduced power state, the resume time upon detection of user activity is reduced since a resume from RAM 16 takes less time than a resume from hard disk drive 18. Outside of the fast resume time periods, such after work hours or on weekends, the ACPI inactivity preferences are enforced so that transition to the S4 reduced power state is permitted after the defined user inactivity time period occurs.

Figure 2:
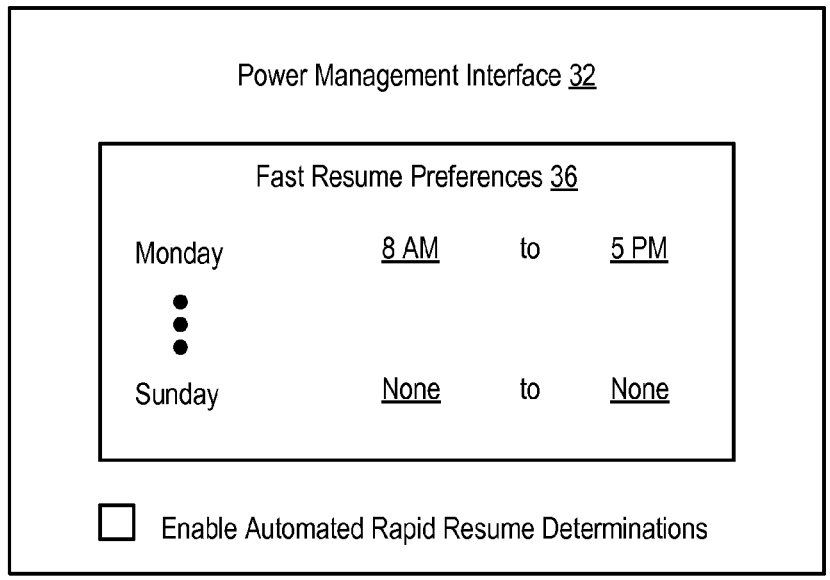
FIG. 2 depicts a power management interface to accept user fast resume preferences.

Referring now to FIG. 2, a power management interface 32 to accept user fast resume preferences is depicted. A fast resume preferences table 36 populates power usage table 34 with fast resume time period preferences input by an end user. During the fast resume time periods, transitions to the S4 hibernate state are overridden so that information handling system 10 instead transitions to the S3 standby state. Transition to the S4 state is limited to defined situations, such as where internal battery power is depleted. As an alternative or in addition to inputting defined fast resume preferences, the end user can enable automated rapid resume determinations by a power usage modeler 38. Power usage modeler 38 monitors end user activity at the information handling system 10 to model time periods during which end user resumption of activity from a reduced power state has a greater likelihood and populates the modeled time periods in power usage table 34. For example, a percent weight is applied to the monitored time of day and time of week having end user activity to predict the time periods in which an end user has a predetermined likelihood of resuming activity and those time of day and time of week periods are automatically populated to power usage table 34 so that the fast resume preferences of the end user automatically adapt to end user activity.

Figure 3:
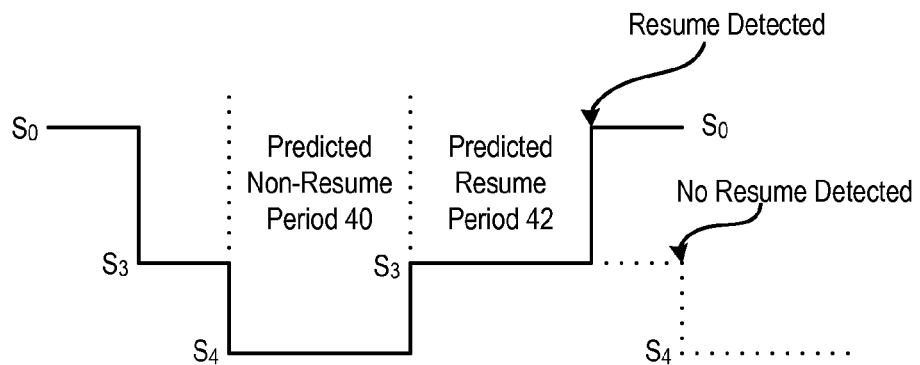
FIG. 3 depicts a temporal view of transitions between power states with adaptive fast resume power management.

Referring now to FIG. 3, a temporal view depicts transitions between power states with adaptive fast resume power management. From an operational S0 state, the information handling system transitions to an S3 state after a defined period of end user inactivity. During predicted non-resume period 40, transition from the S3 standby state to the S4 hibernate state is permitted as defined by the ACPI inactivity settings. From the S4 hibernate state, the end user can resume the operational S0 state with the resume completed from operating system recovery information stored in the hard disk drive or other persistent memory. During predicted resume period 42, the ACPI inactivity settings are overridden so that the information handling system transitions to an S3 state instead of an S4 state. For example, if the user inactivity reaches the threshold for transition from the S3 to the S4 state during a predicted resume period 42, the transition is overridden and the information handling system stays in the S3 state. If as is depicted by FIG. 3, the information handling system is in the S4 hibernate state when a predicted resume period occurs, the information handling system automatically transitions from the S4 state to the S3 state so that the end user experiences a fast resume upon initiation of use of the system. However, in order to avoid unnecessary power usage, automated transition to the S3 state during a predicted resume period 42 can be reversed to return to the S4 state if a resume is not detected in a predetermined time period, such as two hours.

Figure 4:
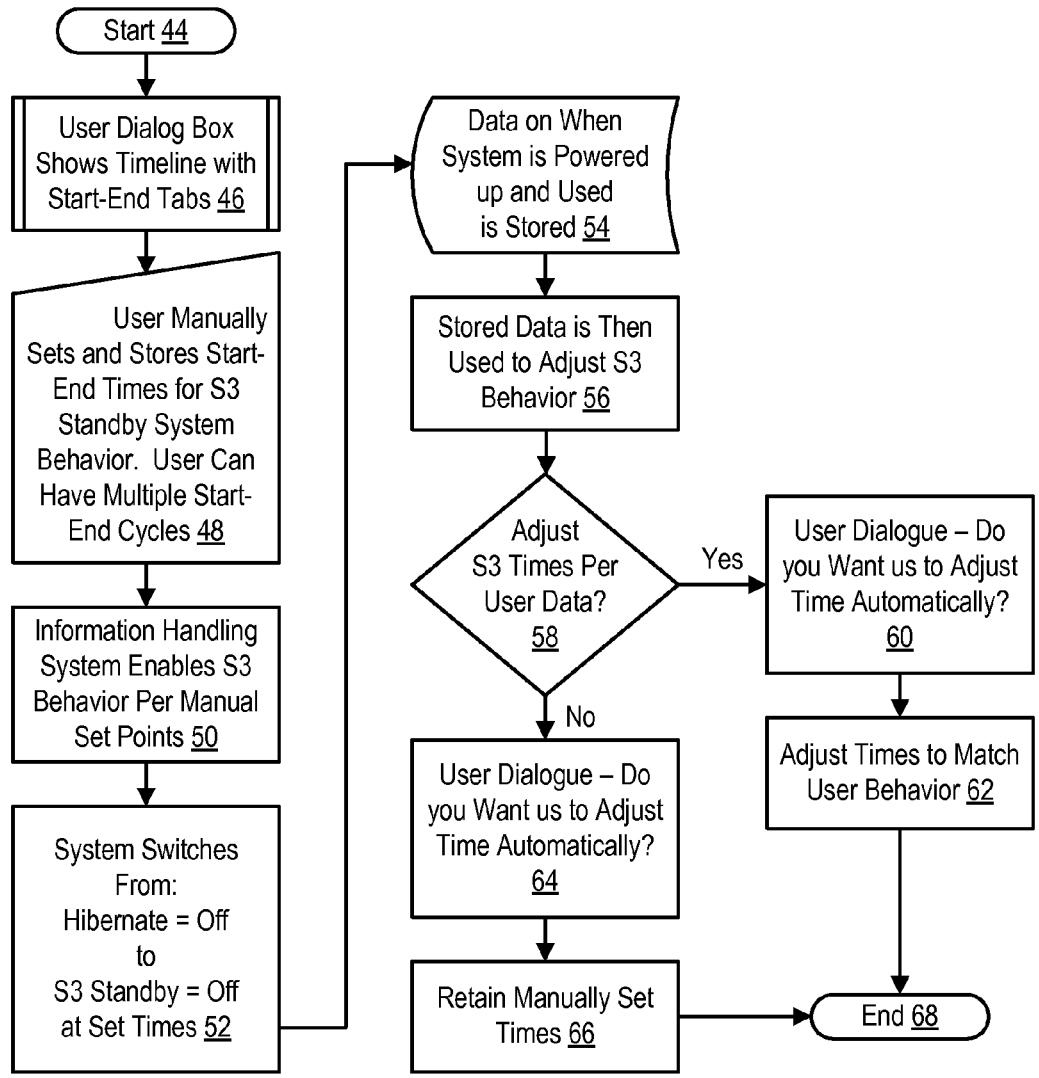
FIG. 4 depicts a flow diagram of a process for adaptive fast resume power management.

Referring now to FIG. 4, a flow diagram depicts a process for adaptive fast resume power management. The process starts at step 44, such as with initial power-up of the system, and proceeds to step 46 to present a user dialog box showing a timeline with start and end tabs that define desired fast resume time periods. At step 48, the user manually sets and stores start and end times for S3 standby behavior with multiple start and end cycles allowed. At step 50, the information handling system enables the S3 behavior as input in the manual set points. At step 52, the information handling system switches from hibernate equals off to S3 standby equals off at the times input in step 48 and enabled in step 50. Thus, commands to enter the S4 hibernate state instead result in entry to the S3 standby state. At step 54 data is automatically gathered on when the information handling system is powered up and used by monitoring end user interaction with the system. At step 56, the stored data is analyzed and used to adjust S3 behavior input by the end user. At step 58, a determination is made of whether to adjust S3 fast resume times based on the user data. If so, the process continues to step 60 to receive a response to a user dialogue to allow automated adjustment to S3 behavior based upon monitored user interactions and, at step 62 the fast response times having S3 behavior are adjusted to adapt to end user usage of the information handling system. If not, the process continues to step 64 to receive a response to a user dialogue to maintain user-defined S3 fast resume behavior and, at step 66, the manually-set S3 behavior is retained.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to process information;
   a power manager running on the processing components, the power manager operable to transition selected of the processing components between an operational state and plural reduced power states according to default settings, the reduced power states including a standby state having operating system recovery information stored in random access memory and a hibernate state having operating system recovery information stored in persistent memory; and
   a power usage table interfaced with the power manager, the power usage table having one or more fast resume time periods;
   wherein the power manager is further operable to override default setting transitions from the standby state to the hibernate state during the fast resume time periods.

2. The information handling system of claim 1 wherein the standby state comprises the ACPI S3 state and the hibernate state comprises the ACPI S4 state.

3. The information handling system of claim 1 further comprising a power management interface operable to accept end user inputs to populate the power usage table with fast resume time periods.

4. The information handling system of claim 1 further comprising a power usage modeler interfaced with the power usage table, the power usage modeler operable to monitor end user interactions with the processing components to populate the power usage table with fast resume times.

5. The information handling system of claim 4 wherein the power usage modeler is further operable to apply monitored end user interactions to predict one or more non-resume periods and wherein the power manager is further operable to transition the processing components to the hibernate state during the non-resume periods.

6. The information handling system of claim 5 wherein the power manager is further operable to transition the processing components from the hibernate state to the standby state a predetermined amount of time before the end of a non-resume period.

7. The information handling system of claim 5 wherein the persistent memory used by the hibernate state is a hard disk drive.

8. A method for managing information handling system power usage, the method comprising:
   determining one or more fast resume time periods;
   powering down the information handling system to a standby state after a predetermined period of end user inactivity, the standby state having operating system recovery information stored in random access memory;
   powering down the information handling system from the standby state to a hibernate state after a predetermined period of end user inactivity, the hibernate state having operating system recovery information stored in persistent memory; and
   limiting the powering down of the information handling system from the standby state to the hibernate state during the fast resume time periods.

9. The method of claim 8 wherein determining one or more fast resume time periods further comprises:

receiving fast resume user preferences associated with the information handling system; and associating the fast resume user preferences with the one or more fast resume time periods.

10. The method of claim 8 wherein determining one or more fast resume time periods further comprises:

monitoring user activity at the information handling system;

modeling the user activity to determine user fast resume preferences; and associating the modeled user fast resume preferences with the one or more fast resume time periods.

11. The method of claim 8 further comprising:

powering up the information handling system from the hibernate state to the standby state a predetermined time before a fast resume time period occurs.

12. The method of claim 8 wherein the standby state comprises an ACPI S3 state and the hibernate state comprises ACPI S4 state.

13. The method of claim 8 wherein the persistent memory comprises a hard disk drive.

14. A system for managing information handling system power consumption, the system comprising:

a power manager operable to transition the information handling system between an operational state, a standby state having a standby resume time and a hibernate state having a hibernate resume time, the standby state resume time being less than the hibernate state resume time; and a power usage table storing fast resume time periods;

wherein the power manager is further operable to limit transitions from the standby state to the hibernate state during the fast resume time periods.

15. The system of claim 14 wherein the standby state comprises an ACPI S3 state and the hibernate state comprises an ACPI S4 state.

16. The system of claim 14 wherein the power manager stores operating system recovery information in random access memory for the standby state and stores operating system recovery information in a hard disk drive for the hibernate state.

17. The system of claim 14 further comprising a power management interface operable to accept user preferences for the fast resume time periods.

18. The system of claim 14 further comprising a power usage modeler operable to monitor user activity at the information handling system to predict fast resume times for the user based on a likelihood that the user will input to the information handling system.

19. The system of claim 14 wherein the power manager is further operable to automatically transition the information handling system from the hibernate state to a standby state a predetermined time before a fast resume time period begins.

20. The system of claim 19 wherein the power manager is further operable to return the information handling system from the hibernate state to the standby state if user activity is not detected in a predetermined time period.

* * * * *